US012379111B2

(12) United States Patent
Opdahl et al.

(10) Patent No.: US 12,379,111 B2
(45) Date of Patent: Aug. 5, 2025

(54) FRICTION HEATED OVEN

(71) Applicant: Thermal Product Solutions, New Columbia, PA (US)

(72) Inventors: Barry J. Opdahl, Williamsport, PA (US); Cory H. Vesey, Winfield, PA (US); Michael A. Schneck, New Berlin, PA (US)

(73) Assignee: Thermal Product Solutions, New Columbia, PA (US)

( * ) Notice: Subject to any disclaimer, the term of this patent is extended or adjusted under 35 U.S.C. 154(b) by 0 days.

(21) Appl. No.: 18/058,300

(22) Filed: Nov. 23, 2022

(65) Prior Publication Data

US 2023/0091699 A1 Mar. 23, 2023

Related U.S. Application Data

(63) Continuation of application No. 16/257,933, filed on Jan. 25, 2019, now Pat. No. 11,543,136.

(51) Int. Cl.
*F24C 15/32* (2006.01)
*F27D 19/00* (2006.01)
*F27D 7/04* (2006.01)

(52) U.S. Cl.
CPC ............ *F24C 15/322* (2013.01); *F27D 19/00* (2013.01); *F24C 15/32* (2013.01); *F27D 2007/045* (2013.01); *F27D 2019/0003* (2013.01); *F27D 2019/0006* (2013.01)

(58) Field of Classification Search
CPC ........ F24C 15/32; F24C 15/322; F27D 19/00; F27D 2007/045; F27D 2019/0003; F27D 2019/0006
USPC .......................................................... 219/400
See application file for complete search history.

(56) References Cited

U.S. PATENT DOCUMENTS 3,807,383 A 4/1974 Lawler
3,958,552 A 5/1976 Lawler
3,977,387 A 8/1976 Lawler
4,029,463 A * 6/1977 Johansson ................ A21B 1/26 219/400
4,319,408 A 3/1982 Kuboyama
4,426,793 A 1/1984 Kuboyama
4,678,400 A * 7/1987 Kuboyama ............. F24V 40/00 34/92
6,872,918 B2 3/2005 Toll
(Continued)

FOREIGN PATENT DOCUMENTS

JP 2009008306 A * 1/2009

OTHER PUBLICATIONS

JP-2009008306-A—Translation (Year: 2009).*
(Continued)

*Primary Examiner* — Steven B Mcallister
*Assistant Examiner* — Benjamin W Johnson
(74) *Attorney, Agent, or Firm* — Amin, Turocy & Watson, LLP

(57) ABSTRACT

Techniques regarding a fan friction oven are provided. For example, one or more embodiments described herein can regard an apparatus comprising a processing chamber in fluid communication with a heating blower and a circulation blower. The heating blower can heat air adjacent to the processing chamber by fan friction. Also, the circulation blower can circulate the air heated by the heating blower into the processing chamber.

8 Claims, 7 Drawing Sheets

(56) References Cited

U.S. PATENT DOCUMENTS

| | | | | |
|---|---|---|---|---|
| 2003/0085219 | A1* | 5/2003 | Toll | B29C 35/16<br>219/400 |
| 2003/0172919 | A1* | 9/2003 | Rabas | F24C 15/322<br>126/21 R |
| 2012/0211482 | A1 | 8/2012 | Hertzberg et al. | |

OTHER PUBLICATIONS

Final Office Action received for U.S. Appl. No. 16/257,933 dated Jun. 14, 2022, 35 pages.
Non-Final Office Action received for U.S. Appl. No. 16/257,933 dated Nov. 26, 2021, 29 pages.

* cited by examiner

600

FRICTION HEATED OVEN

CROSS-REFERENCE TO RELATED APPLICATIONS

This application claims priority to U.S. Non-Provisional patent application Ser. No. 16/257,933 filed on Jan. 25, 2019, entitled “FRICTION HEATED OVEN.” The entirety of the aforementioned application is incorporated by reference herein.

BACKGROUND

The subject disclosure relates to ovens heated by fan friction, and more specifically, to one or more ovens that can modulate temperature based on adjusting the amount of heat generated by fan friction independent of air circulation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, apparatuses, and/or methods regarding modulating the temperature of an oven through fan friction are described.

According to an embodiment, an oven is provided. The oven can comprise a processing chamber in fluid communication with a heating blower, wherein the heating blower heats air by fan friction, and wherein a temperature of the air in the processing chamber is modulated by a varying speed of the heating blower.

According to an embodiment, a method for heating an oven is provided. The method can comprise heating, by a heating blower, air by fan friction; and varying a speed of the heating blower to control a temperature in the oven.

According to an embodiment, an oven is provided. The oven can comprise a heating blower that heats air by fan friction; a circulation blower that generates an airflow by circulating the air heated by the heating blower within the oven; and a motor speed controller that can vary a rotation speed of the heating blower to control a temperature within the oven.

DETAILED DESCRIPTION

Figure 1:
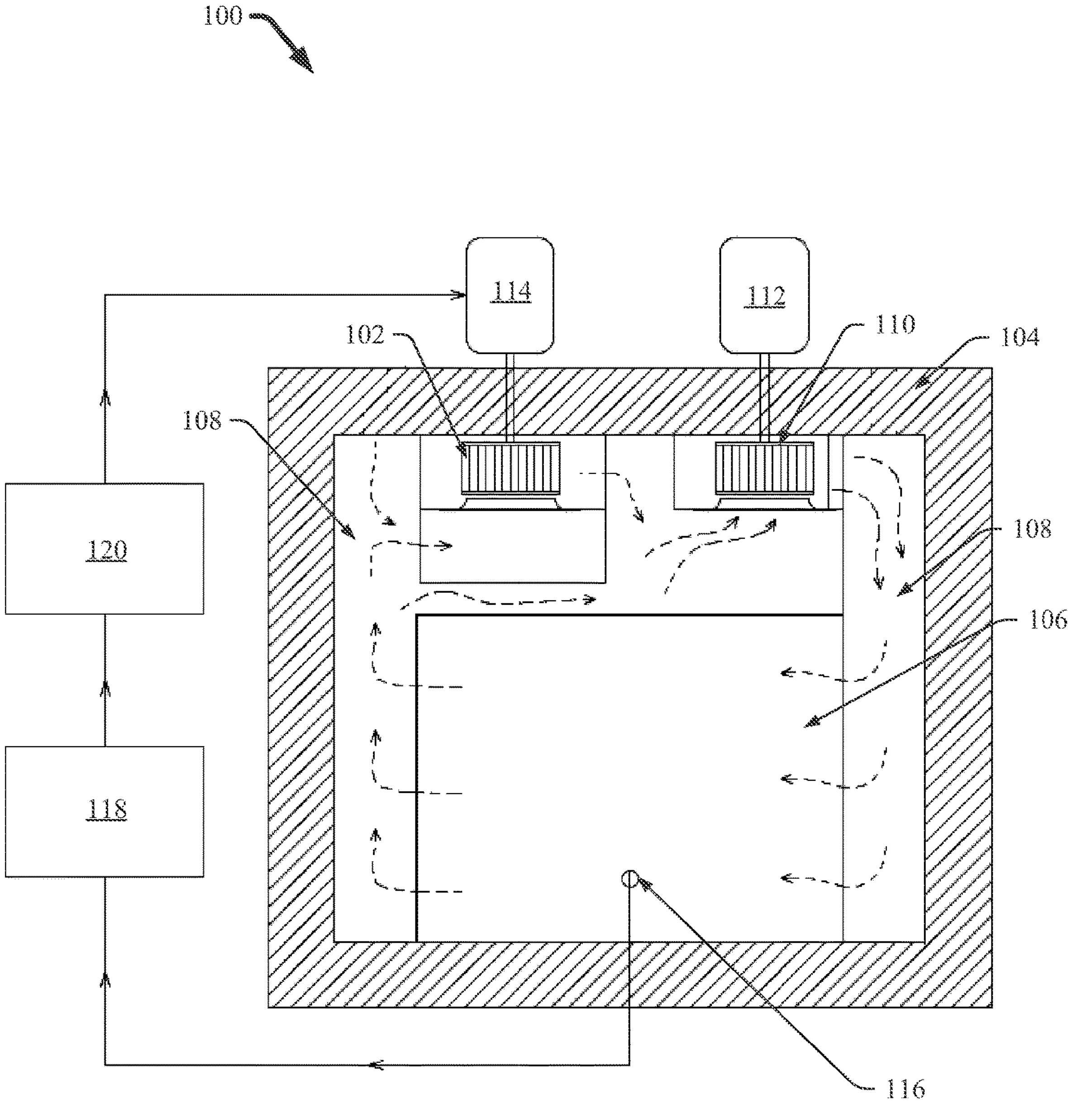
FIG. 1 illustrates a block diagram of an example, non-limiting oven that can modulate temperature by varying fan friction independent of air circulation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Conventional ovens often employ heating elements (e.g., electrical resistance heating elements) to communicate heat into a chamber for heating one or more items. In such instances, the heating elements themselves can have surface temperatures significantly higher than the surrounding environment. Thereby, the heating elements can cause non-uniform heating within the chamber (e.g., hot spots). Additionally, the heated surfaces of the heating elements can present an ignition hazard for flammable gases and/or vapors within the oven (e.g., caused by the heating of the one or more items and/or introduced to facilitate the heating). Known techniques seeking to avoid the potential hazards brought by the use of conventional heating elements (e.g., electrical resistance heaters, steam coils, fluid cells, fuel fired burners, a combination thereof, and/or the like) comprise circulating heated air into the chamber to render the heating of the one or more items; however, these techniques render heating the chamber dependent on manipulation of the air circulation (e.g., circulating less heated air and/or more cool air into the oven system). Varying the air circulation (e.g., adjusting the circulation rate by altering the exhaust rate) can affect the drying rates of the subject items and/or dilution rates of vapors generated by the heating.

Various embodiments described herein can regard an oven that can generate heat through fan friction and/or modulate temperature within a processing chamber independent of air circulation. In one or more embodiments, the oven can comprise a heating blower and a circulation blower, which can be operated independent of each other. The heating blower can heat air via fan friction, while the circulation blower can circulate the heated air through the oven. Advantageously, the heating blower’s rotational speed can be modulated; thereby, heat inputted into the processing chamber can be adjusted without varying the circulation flow rate. For example, one or more of the embodiments described herein can enable the air circulation (e.g., recirculation rates, intake rates, and/or exhaust rates) to remain constant at least because modulation of the heating blower can be used to independently control the oven temperature.

As used herein, the term “air” can refer to the normal atmospheric environment inside and/or outside the one or more oven disclosed herein. For example, air can include the gaseous substance that surrounds the Earth (e.g., a mixture mainly of oxygen and nitrogen). In another example, air can include one or more gases such as, but not limited to: noble gases (e.g., argon), nitrogen, steam, a combination thereof, and/or the like. Additionally, air can be a fluid (e.g., a gas, a liquid, and/or a combination thereof).

FIG. 1 illustrates a diagram of an example, non-limiting oven 100 that can generate heat by a heating blower 102 and/or modulate a heating temperature independent of air circulation within the oven 100 in accordance with one or more embodiments described herein. Repetitive description of like elements employed in other embodiments described herein is omitted for sake of brevity. The oven 100 can be defined by one or more exterior walls 104, which can be thermally insulated and/or can seal against unwanted air leakage between the interior of the oven 100 and the exterior of the oven 100. For example, the one or more exterior walls 104 can comprise one or more liners and/or insulation materials. One of ordinary skill in the art will recognize that the material composition and/or dimensions of the one or more outer walls 104 can vary depending on the function of the oven 100. Example materials that can comprise the one or more outer walls 104 can include, but are not limited to: iron, an iron alloy, steel, carbon steel, galvanized steel, aluminized steel, stainless steel, aluminum, glass, plastics, composites, wood, ceramics, a combination thereof, and/or the like.

As shown in FIG. 1, the oven 100 can comprise one or more processing chambers 106 located in the interior space defined by the one or more exterior walls 104. The one or more processing chambers 106 can define one or more spaces within the oven 100 where one or more items can be heated and/or cooled. For example, one or more items can be deposited and/or withdrawn from the one or more processing chambers 106 via one or more doors (not shown). The one or more processing chambers 106 can comprise the same composition as the one or more exterior walls 104 or a different composition than the one or more exterior walls 104. One of ordinary skill in the art will recognize that the material composition and/or dimensions of the one or more processing chambers 106 can vary depending on the function of the oven 100. Example materials that can comprise the one or more processing chambers 106 can include, but are not limited to: iron, an iron alloy, steel, carbon steel, galvanized steel, aluminized steel, stainless steel, aluminum, glass, plastics, composites, ceramics, a combination thereof, and/or the like.

FIG. 1 illustrates an embodiment in which one or more side walls of the one or more processing chambers 106 can be perforated to facilitate airflow (e.g., as represented by the dashed arrows shown in FIG. 1) into and/or through the one or more processing chambers 106. While FIG. 1 depicts an embodiment that can facilitate horizontal air circulation through the one or more processing chambers 106, the architecture of the one or more processing chambers 106 is not so limited. For example, one or more of the sidewalls of the one or more processing chambers 106 can be perforated to facilitate vertical air circulation.

Further, one or more circulation corridors 108 can be located between the one or more processing chambers 106 and the one or more exterior walls 104. The one or more circulation corridors 108 can direct air through the oven 100. The one or more circulation corridors 108 can work in conjunction with one or more circulation blowers 110 to generate a desired airflow (e.g., represented by the dashed arrows shown in FIG. 1) through the oven 100. The one or more circulation blowers 110 can comprise one or more high-velocity centrifugal blowers. Example types of circulation blowers 110 can include, but are not limited to: forward-curved blowers, backward-incline blowers, backward-curved blowers, radial blowers, airfoil blowers, regenerative blowers, axial fans, propeller type fans, tubeaxial fans, vaneaxial fans, turbines, housingless blowers, eductors, jet pumps, venturi pumps, a combination thereof, and/or the like. As shown in FIG. 1, the one or more circulation blowers 110 can be operably coupled to one or more first motors 112, which can be located external to the oven 100. In one or more embodiments, the one or more circulation corridors 108 can guide an airflow generated by the one or more circulation blowers 110 into the one or more processing chambers 106 (e.g., as shown in FIG. 1). For example, one or more walls defining the one or more circulation corridors 108 can be perforated to facilitate the introduction and/or exit of airflow into and/or out of the one or more circulation corridors 108. For instance, perforated sections of wall can be depicted in FIG. 1 wherein the airflow (e.g., represented by dashed arrows) extend through the subject wall.

One or more of the circulation corridors 108 can also be in fluid communication with the one or more heating blowers 102. The one or more heating blowers 102 can comprise one or more devices that can use the friction of moving air to produce heat (e.g., fan friction). One of ordinary skill in the art will recognize that various types of impellers and/or housing can comprise the one or more heating blowers 102. In various embodiments, the one or more heating blowers 102 can heat air traveling in the one or more circulation corridors 108. Example types of heating blowers 102 can include, but are not limited to: forward-curved blowers, backward-incline blowers, backward-curved blowers, radial blowers, airfoil blowers, regenerative blowers, axial fans, propeller type fans, tubeaxial fans, vaneaxial fans, turbines, housingless blowers, eductors, jet pumps, venturi pumps, mixing impellers, shear mixers, vortex tubes, dispersion blades, blending blades, paddle mixers, a combination thereof, and/or the like. In some examples, the one or more heating blowers 102 can use fan friction to heat air comprised within the one or more circulation corridors 108. For instance, the one or more heating blowers 102 can be the primary heat source for the oven 100; thereby, replacing conventional heating elements, which can represent one or more hazards for at least the reasons described herein. As shown in FIG. 1, the one or more heating blowers 102 can be operably coupled to one or more second motors 114, which can be located external to the oven 100.

In one or more embodiments, the one or more heating blowers 102 can be in fluid communication with the one or more circulation blowers 110 (e.g., as shown in FIG. 1). For example, the one or more heating blowers 102 can heat air provided in the one or more circulation corridors 108 and/or supply the heated air to the one or more circulation blowers 110. The one or more circulation blowers 110 can then modulate circulation of the heated air in the one or more circulation corridors 108. For instance, the one or more circulation blowers 110 can moderate airflow in the one or more circulation corridors 108 that travels to the one or more processing chambers 106. At least because the one or more heating blowers 102 and the one or more circulation blowers 110 are powered by distinct motors (e.g., one or more first motors 112 and/or one or more second motors 114), the one or more heating blowers 102 can be operated independent of the one or more circulation blowers 110.

In one or more embodiments of the oven 100 can also comprise one or more temperature sensors 116 located within the oven 100. For instance, the one or more temperature sensors 116 can be located within the one or more processing chambers 106 (e.g., as shown in FIG. 1). Example temperature sensors 116 can include, but are not limited to: a thermocouple, thermistor, a resistance temperature detector (RTD), a semiconductor-based temperature sensor, an infrared pyrometer, a combination thereof, and/or the like. The one or more temperature sensors 116 can be operably coupled to one or more temperature controllers 118 via a direct electrical connection (e.g., as shown in FIG. 1) and/or a wireless network connection. For example, the one or more temperature controllers 118 can be digital temperature controllers 118 that can monitor the temperature of the air within the processing chamber 106 (e.g., via the one or more temperatures sensors 116). A user of the oven 100 can utilize the one or more temperature controllers 118 to observe the air temperature within the one or more processing chambers 106 and/or set changes to said temperature (e.g., increase or decrease the air temperature within the one or more processing chambers 106). In one or more embodiments, the one or more temperature controllers 118 can be operably coupled to a plurality of temperature sensors 116 located in various positions within the one or more processing chambers 106 to monitor air temperature uniformity within the one or more processing chambers 106. Example temperature controllers 118 can include, but are not limited to: analog controllers, digital proportional integral derivative (PID) controllers, programmable logic controllers, computer software, a combination thereof, and/or the like.

The one or more temperature controllers 118 can be further coupled to one or more motor speed controllers 120 via a direct electrical connection (e.g., as shown in FIG. 1) and/or a wireless network connection. Further, the one or more motor speed controllers 120 can be operably coupled to the one or more second motors 114 via a direct electrical connection (e.g., as shown in FIG. 1) and/or a wireless network connection. For example, the one or more motor speed controllers 120 can be an alternating current ("AC") variable frequency drive ("VFD"), which can enable the revolutions per minute ("RPM") of the one or more second motors 114 to be varied over a wide range. Example one or more motor speed controllers 120 can include, but are not limited to: AC VFDs, direct current ("DC") speed controls, mechanical speed controls, a combination thereof, and/or the like.

The one or more temperature controllers 118 can generate a signal based on the monitored air temperature within the one or more processing chambers 106 and/or one or more user inputs supplied to the one or more temperature controllers 118. The signal can be sent to the one or more motor speed controllers 120, which can then modulate operation of the one or more second motors 114, and thereby the one or more heating blowers 102, based on the signal (e.g., an electrical signal). For instance, the one or more motor speed controllers 120 can control operation of the one or more second motors 114 to vary the rotation speed of one or more fan blades comprised within the one or more heating blowers 102; thereby modulating the amount of heat generated by the one or more heating blowers 102. Thereby, the one or more motor speed controllers 120 can modulate the temperature within the one or more processing chambers 106 by varying the operation of the one or more heating blowers 102 (e.g., via the one or more second motors 114) based on one or more signals (e.g., commands) generated by the one or more temperature controllers 118.

Moreover, operation of the one or more heating blowers 102 can be controlled (e.g., by the one or more motor speed controllers 120) independent of the one or more circulation blowers 110. Thereby the amount of heat generated by the oven 100 (e.g., via fan friction of the one or more heating blowers 102 instead of, or supplement to, conventional heating elements) can be adjusted independent of the airflow established by the one or more circulation blowers 110. For example, the amount of heat generated by the one or more heating blowers 102 can vary based on the temperature conditions within the one or more processing chambers 106 (e.g., as monitored by the one or more temperature sensors 116), while the airflow within the oven 100 can remain constant.

In one or more embodiments, one or more conventional heat sources can be present within and/or adjacent to the oven 100 in addition to the one or more heating blowers 102 and/or circulation blowers 110. For example, the one or more conventional heat sources can provide supplemental heat to the heat generated by the one or more heating blowers 102, which can enable embodiments of the oven 100 comprising heating blowers 102 of various size and/or power. The conventional heat sources can have a fixed power output or can be adjustable and/or modulated. Additionally, the type of circulation blowers 110 included in the oven 100 can be selected based on a desired base temperature range of the oven 100. In one or more embodiments, one or more of the heating blowers 102 can operate at a fixed speed to establish a base heating temperature, wherein one or more other heating blowers 102 can operate at adjustable speeds to modulate the working temperature within the one or more processing chambers 106.

Figure 2:
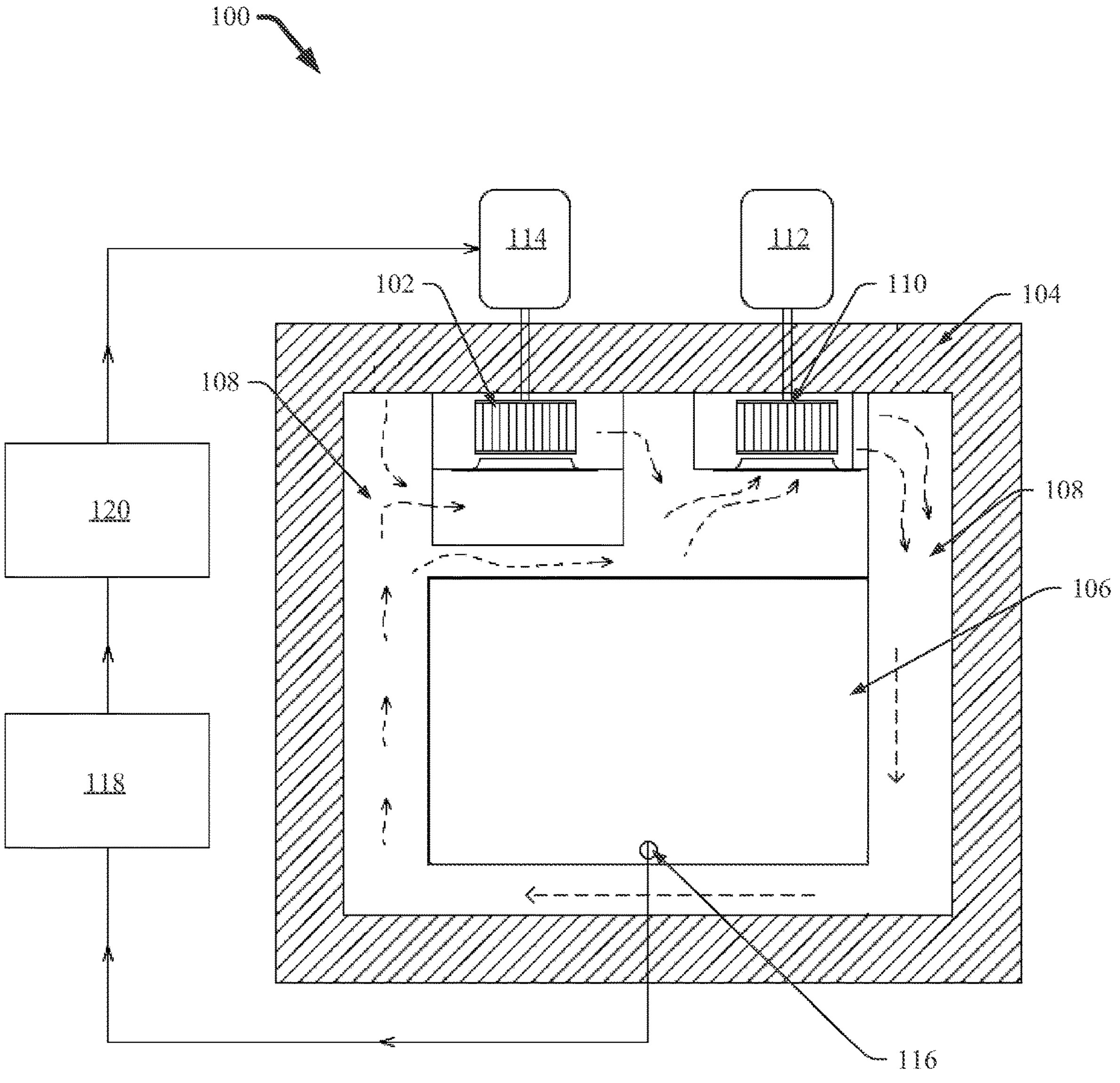
FIG. 2 illustrates a block diagram of an example, non-limiting oven that can heat air by fan friction and/or circulate the heated air through a processing chamber to heat one or more items in accordance with one or more embodiments described herein.

FIG. 2 illustrates an example, non-limiting diagram of the oven 100, wherein the one or more circulation corridors 108 can extend further around the one or more processing chambers 106. Repetitive description of like elements employed in other embodiments described herein is omitted for sake of brevity. FIG. 2 exemplifies that the one or more circulation corridors 108 can be positioned in a variety of arrangements to facilitate the heating of one or more processing chambers 106 via one or more airflow configurations (e.g., driven by the one or more circulation blowers 110).

As shown in FIG. 2, the one or more circulation corridors 108 can surround the entire, or substantially the entire, perimeter of the one or more processing chambers 106. For example, air heated by the one or more heating blowers 102 can be circulated around and/or adjacent to the one or more processing chambers 106 by the one or more circulation blowers 110 (e.g., as shown in FIG. 2). Heated air flowing adjacent to the one or more processing chambers 106 can in turn heat the one or more processing chambers 106 (e.g., at least because of the heated air's proximity to the one or more processing chambers 106). In another example, various airflow configurations within the one or more processing chambers 106 can be facilitated by supplying heated air to various sides of the one or more processing chambers 106 via the one or more circulation corridors 108 extending around the one or more processing chambers 106. For instance, three of the walls defining a processing chamber 106 can be perforated to facilitate horizontal and/or vertical airflow configurations.

Figure 3:
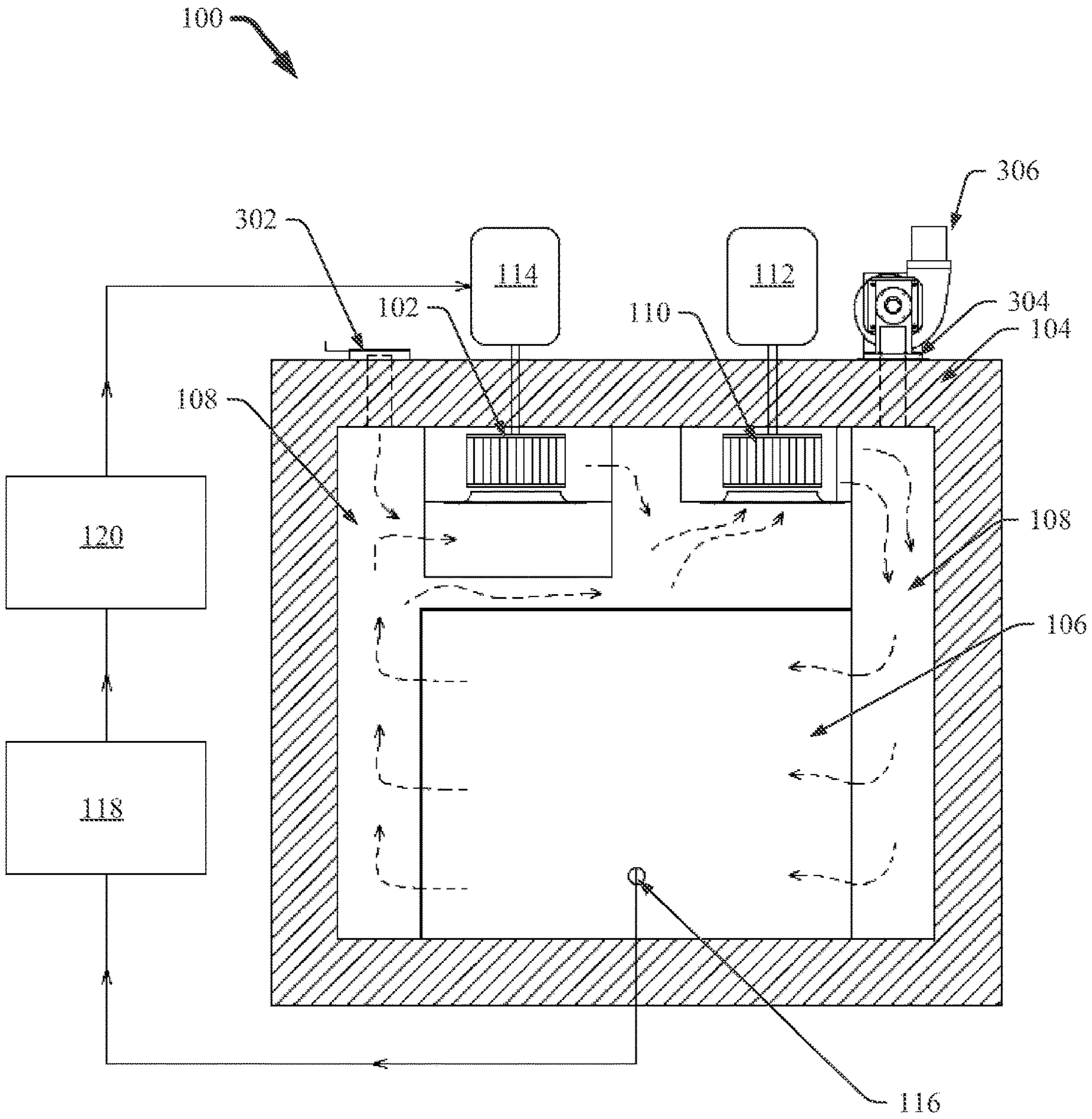
FIG. 3 illustrates a block diagram of an example, non-limiting oven that can modulate temperature by varying fan friction independent of air circulation in accordance with one or more embodiments described herein.

FIG. 3 illustrates an example, non-limiting diagram of the oven 100 further comprising one or more intake ports 302 and/or one or more exhaust ports 304 in accordance with one or more embodiments described herein. Repetitive description of like elements employed in other embodiments described herein is omitted for sake of brevity. As shown in FIG. 3, the one or more intake ports 302 and/or the one or more exhaust ports 304 can be in fluid communication with the one or more circulation corridors 108 through the one or more exterior walls 104 of the oven 100.

In one or more embodiments, the intake port 302 and/or the exhaust port 304 can be utilized by the oven 100 to draw external air into the oven 100 and/or expel processed air out of the oven 100. By cycling fresh air into the airflow within the oven 100 and/or expelling processed air out of the oven 100, vapors resulting from heating one or more items within the one or more processing chambers 106 can be expelled from the one or more processing chambers 106 before becoming hazardous.

For example, in one or more embodiments air heated by the one or more heating blowers 102 can be fresh air introduced into the oven 100 via the one or more air intake ports 302. For instance, the fresh air can be isolated from the processed air (e.g., air previously heated and/or introduced into the one or more processing chambers 106) such that the one or more heating blowers 102 heat fresh air and can avoid heating processed air, which can comprise one or more contaminates originating from the heating in the one or more processing chambers 106. The one or more circulation blowers 110 can then circulate the heated fresh air through the oven 100 (e.g., into the one or more processing chambers 106) while the processed air (e.g., air already used to heat one or more items within the one or more processing chambers 106) can be expelled from the oven 100 via the one or more exhaust ports 304.

In another example, in one or more embodiments the one or more heating blowers 102 can heat fresh air (e.g., supplied by the one or more air intake ports 302) and/or processed air (e.g., previously heated air driven to the one or more heating blowers 102 by an airflow generated by the one or more circulation blowers 110) in combination. In other words, the fresh air can be mixed with processed air within the oven 100 during the heating achieved by the one or more heating blowers 102.

In one or more embodiments, the oven 100 can comprise various configurations of the one or more intake ports 302 and/or exhaust ports 304. For example, the oven 100 can lack the one or more input ports 302 and/or exhaust ports 304 (e.g., as shown in FIG. 1). In another example, the oven 100 can comprise one or more input ports 302 and/or one or more exhaust ports 304. In a further example, the oven 100 can comprise one or more input ports 302 operably coupled to one or more intake blowers (not shown) and/or one or more exhaust ports 304 operably coupled to one or more exhaust blowers 306 (e.g., as shown in FIG. 3).

One of ordinary skill in the art will recognize that the architecture of the one or more circulation corridors 108 can vary to facilitate embodiments in which fresh air is isolated or mixed with processed air during the heating by the one or more heating blowers 102. Whether the fresh air is isolated or mixed with the processed air can depend on the function of the oven 100 and/or the items being heating within the one or more processing chambers 106.

Figure 4:
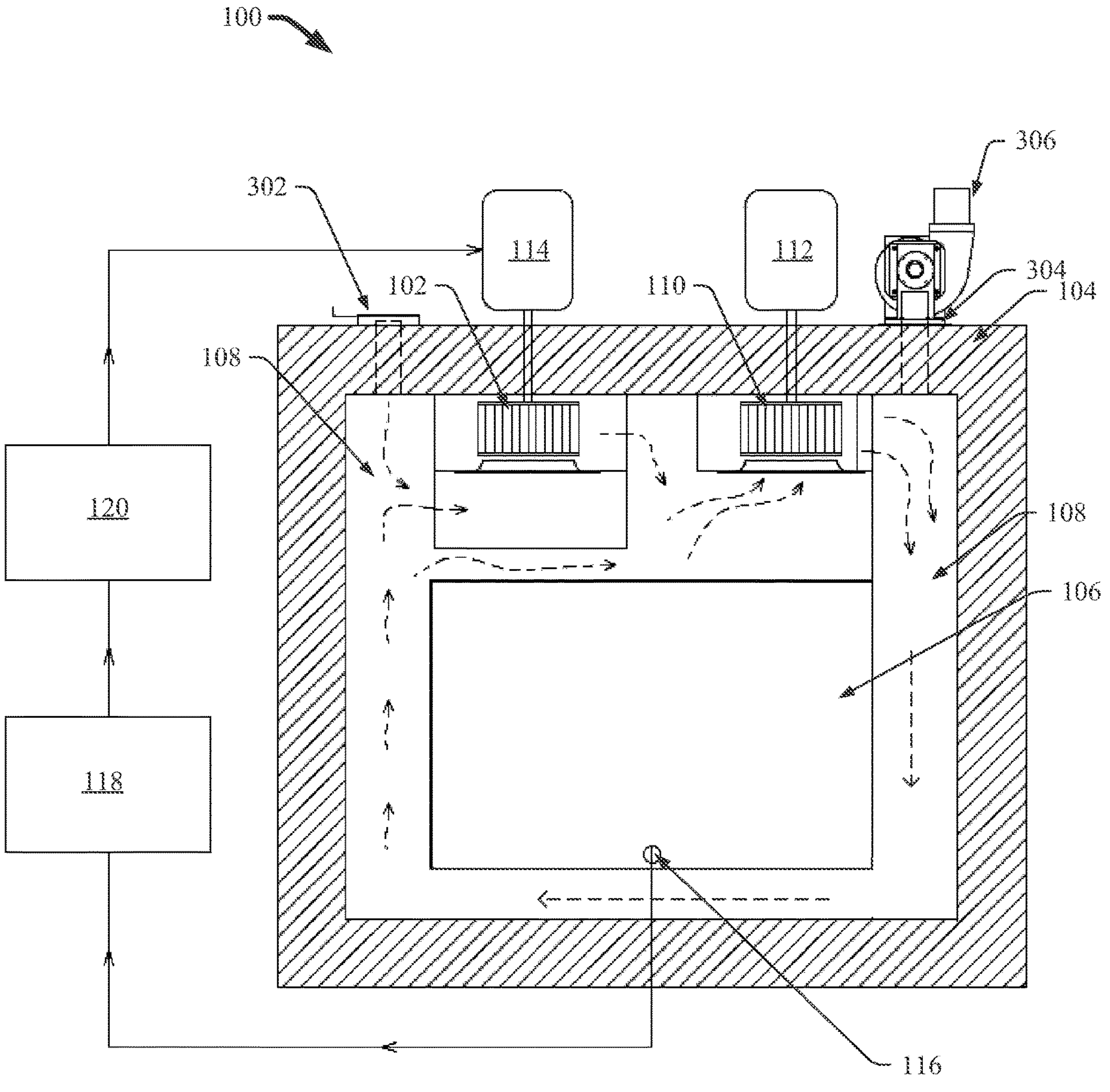
FIG. 4 illustrates a block diagram of an example, non-limiting oven that can heat air by fan friction and/or circulate the heated air through a processing chamber to heat one or more items in accordance with one or more embodiments described herein.

FIG. 4 illustrates a diagram of the example, non-limiting oven 100 comprising the one or more air intake ports 302 and/or exhaust ports 304 (e.g., including one or more exhaust blowers 306) in accordance with one or more embodiments described herein. Repetitive description of like elements employed in other embodiments described herein is omitted for sake of brevity. FIG. 4 exemplifies that the oven 100 can be configured with one or more air intake ports 302 and/or one or more exhaust ports 304 with various circulation corridor 108 arrangements.

Figure 5:
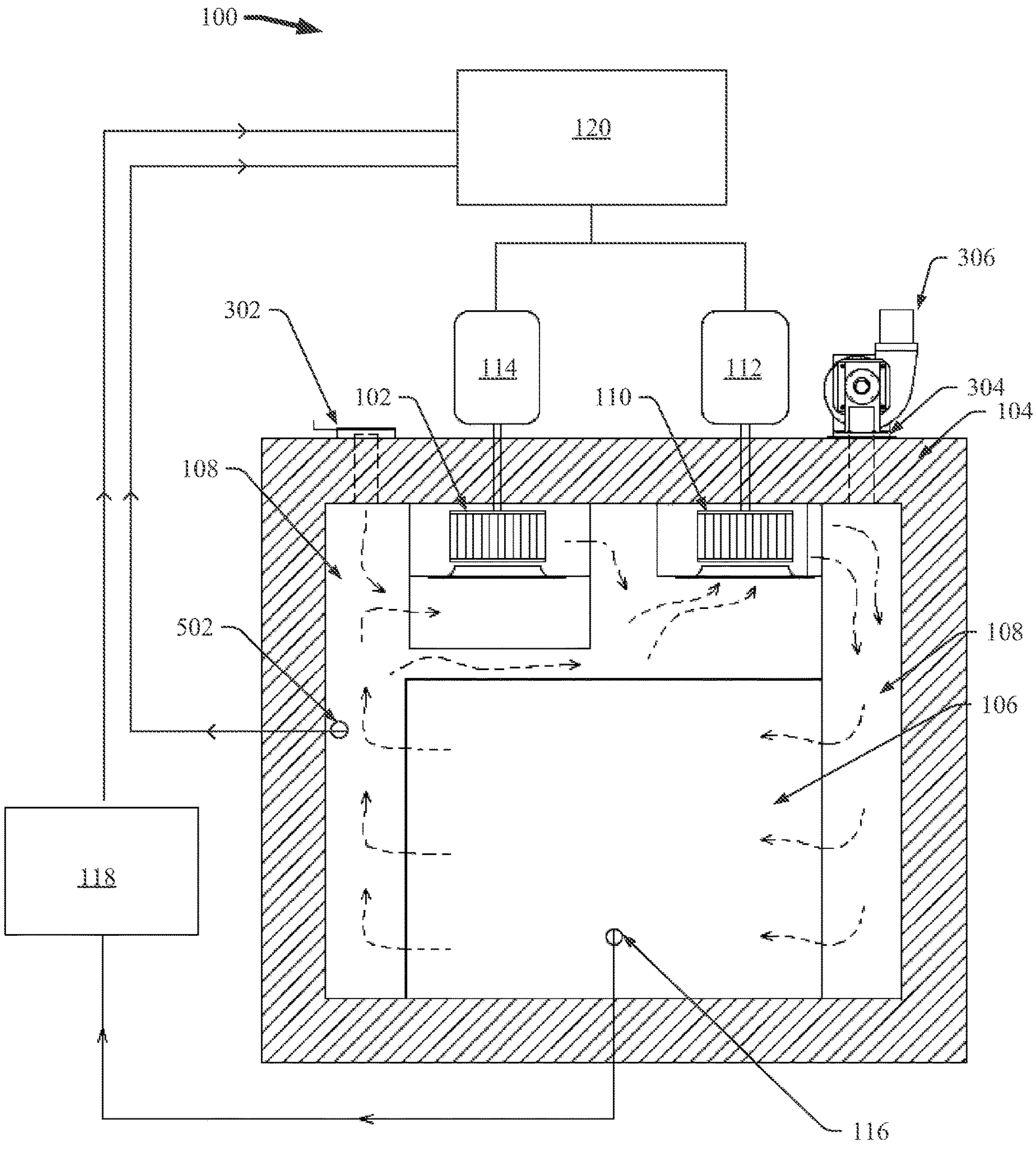
FIG. 5 illustrates a block diagram of an example, non-limiting oven that can modulate temperature by varying fan friction independent of air circulation in accordance with one or more embodiments described herein.

FIG. 5 illustrates a diagram of the example, non-limiting oven 100, wherein the motor speed controller 120 can be operably coupled to both the first motor 112 and/or the second motor 114 in accordance with one or more embodiments described herein. Repetitive description of like elements employed in other embodiments described herein is omitted for sake of brevity. For example, the motor speed controller 120 can control operation of both the one or more heating blowers 102 and/or the one or more circulation blowers 110 (e.g., via the one or more second motors 114 and/or the one or more first motors 112) independent of each other.

Further, the oven 100 can comprise one or more airflow sensors 502 positioned in the one or more circulation corridors 108 (e.g., as shown in FIG. 5) and/or in the one or more processing chambers 106. The one or more airflow sensors 502 can be operably coupled (e.g., via a direct electrical connection and/or via a wireless network connection) to the one or more motor speed controllers 120. Also, the one or more airflow sensors 502 can monitor one or more properties of the airflow generated by the one or more circulation blowers 110 at one or more locations within the oven 100. Example properties that can be monitored by the one or more airflow sensors 502 can include, but are not limited to: air velocity, humidity, air composition (e.g., the presence of one or more hazardous vapors), air temperature, oxygen concentration, dewpoint, a combination thereof, and/or the like. For instance, one or more of the airflow sensors 502 can comprise anemometers to facilitate monitoring air velocity.

In one or more embodiments, the motor speed controller 120 can control operation of the one or more circulation blowers 110 based on one or more airflow properties monitored by the one or more airflow sensors 502. For example, the motor speed controller 120 can increase the RPMs of the one or more first motors 112 in order to increase the amount of airflow generated by the one or more circulation blowers 110 based on an amount of hazardous vapors detected by the one or more airflow sensors 502. Thereby, the oven 100 can mitigate potential damages that can be caused by the build up of hazardous vapors as a result of the heating in the one or more processing chambers 106. As described herein, the motor speed controller 120 can modulate the heating generated by the one or more heating blowers 102 independent of the airflow generated by the one or more circulation blowers 110. Alternatively, in one or more embodiments, the one or more first motors 112 can be controlled by a one motor speed controller 120 while the one or more second motors 114 can be controlled by another motor speed controller 120.

Figure 6:
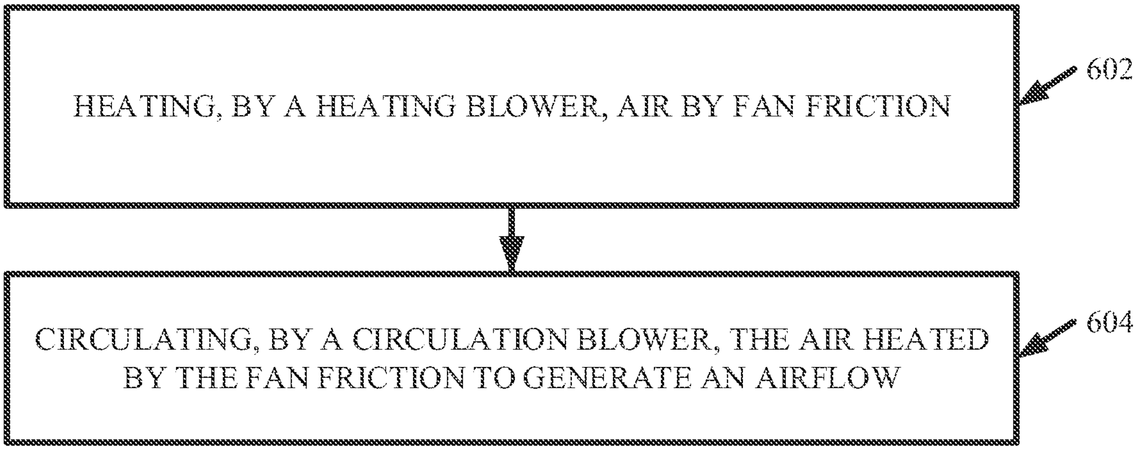
FIG. 6 illustrates a flow diagram of an example, non-limiting method that can facilitate heating an oven by controlling fan friction in accordance with one or more embodiments described herein.

FIG. 6 illustrates a flow diagram of an example, non-limiting method 600 that can regard heating an oven 100 via fan friction independent of adjusting airflow in accordance with one or more embodiments described herein. Repetitive description of like elements employed in other embodiments described herein is omitted for sake of brevity.

At 602, the method 600 can comprise heating, by one or more heating blowers 102 (e.g., comprised within an oven 100), air (e.g., adjacent to one or more processing chambers 106 of the oven 100) by fan friction. In one or more embodiments, the one or more heating blowers 102 can provide the primary and/or sole source of heat for the oven 100. For example, the one or more heating blowers 102 can replace conventional heating elements (e.g., electric resistance heaters, steam coils, fluid coils, fuel fired burners, and/or the like) to heat the one or more processing chambers 106.

At 604, the method 600 can comprise circulating, by one or more circulation blowers 110 (e.g., comprised within the oven 100), the air heated by the fan friction to generate an airflow. For example, the one or more circulation blowers 110 can propel the heated air into one or more circulation corridors 108 extending within the oven 100. For instance, the one or more circulation blowers 110 can generate an airflow of the heated air that can traverse into and/or adjacent to the one or more processing chambers 106. The oven 100 can heat one or more items within the one or more processing chambers 106 by via the airflow of heated air (e.g., air heated by fan friction and propagated into the one or more processing chambers 106 by one or more circulation blowers 110).

Further, the one or more heating blowers 102 can be powered by one or more second motors 114, which can be operably coupled to one or more motor speed controllers 120. The one or more motor speed controllers 120 can control operation of the one or more heating blowers 102 (e.g., via the one or more second motors 114) independent of operation of the one or more circulation blowers 110. For example, a temperature within the one or more processing chambers 106 can be varied (e.g., via modulating the one or more heating blowers 102) by the one or more motor speed controllers 120 while maintaining a constant airflow (e.g., generated by the one or more circulation blowers 110). Advantageously, the temperature within the one or more processing chambers 106 can be modulated independently of the airflow within the one or more processing chambers 106.

Figure 7:
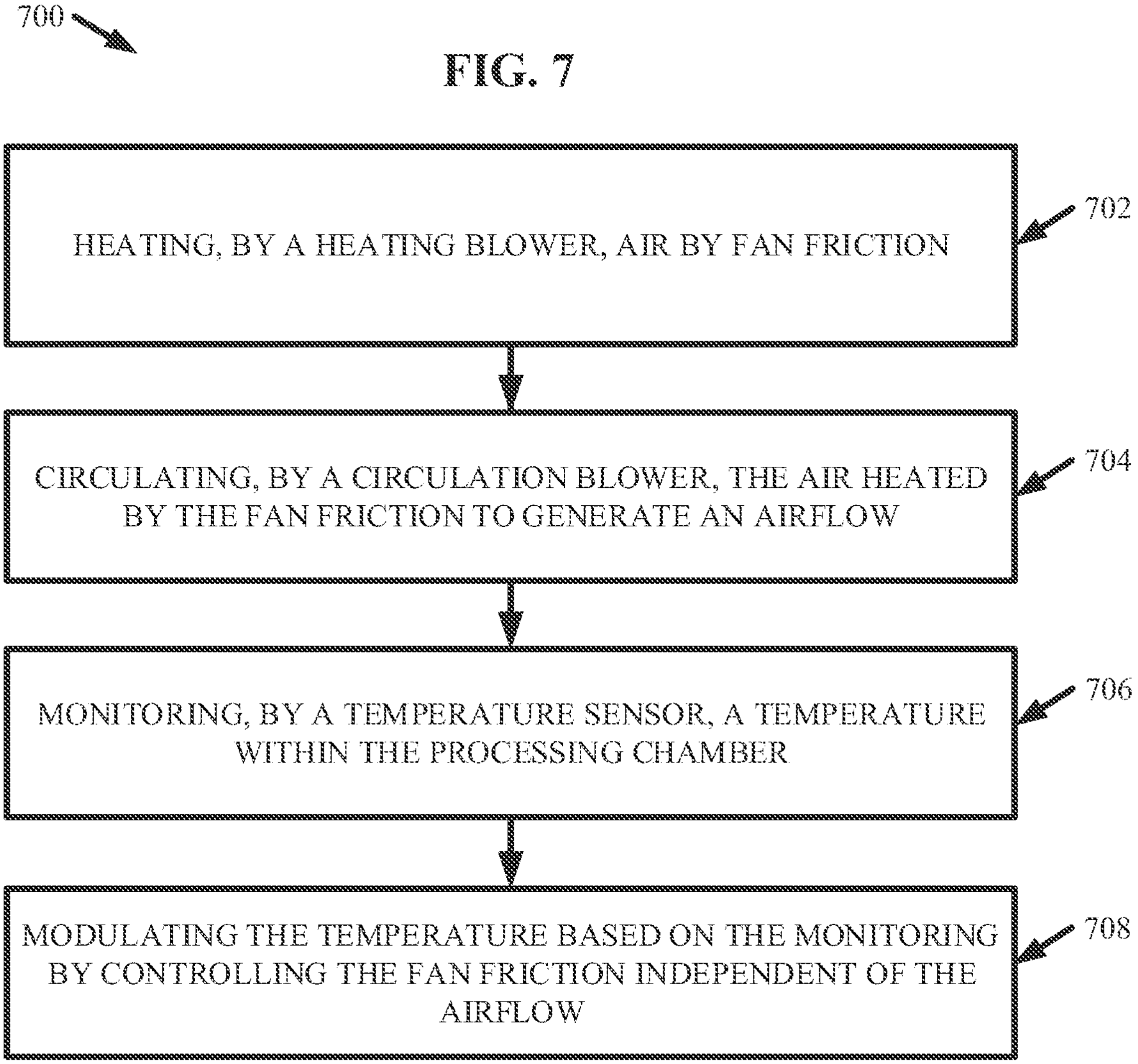
FIG. 7 illustrates a flow diagram of an example, non-limiting method that can facilitate heating an oven by controlling fan friction in accordance with one or more embodiments described herein.

FIG. 7 illustrates a flow diagram of an example, non-limiting method 700 that can regard heating an oven 100 via fan friction independent of adjusting airflow in accordance with one or more embodiments described herein. Repetitive description of like elements employed in other embodiments described herein is omitted for sake of brevity.

At 702, the method 700 can comprise heating, by one or more heating blowers 102 (e.g., comprised within an oven 100), air (e.g., adjacent to one or more processing chambers 106 of the oven 100) by fan friction. In one or more embodiments, the one or more heating blowers 102 can provide the primary and/or sole source of heat for the oven 100. For example, the one or more heating blowers 102 can replace conventional heating elements (e.g., electric resistance heaters, steam coils, fluid coils, fuel fired burners, and/or the like) to heat the one or more processing chambers 106. In some embodiments, the one or more heating blowers 102 can be supplemental sources of heat to one or more conventional heating elements, wherein the temperature within the one or more processing chambers 106 can be modulated via operation of the one or more heating blowers 102.

At 704, the method 700 can comprise circulating, by one or more circulation blowers 110 (e.g., comprised within the oven 100), the air heated by the fan friction to generate an airflow. For example, the one or more circulation blowers 110 can propel the heated air into one or more circulation corridors 108 extending within the oven 100. For instance, the one or more circulation blowers 110 can generate an airflow of the heated air that can traverse into and/or adjacent to the one or more processing chambers 106. The oven 100 can heat one or more items within the one or more processing chambers 106 by via the airflow of heated air (e.g., air heated by fan friction and propagated into the one or more processing chambers 106 by one or more circulation blowers 110).

At 706, the method 700 can comprise monitoring, by one or more temperature sensors 116, a temperature within the one or more processing chambers 106. The one or more temperature sensors 116 can be located within the one or more processing chambers 106 and/or can be operably coupled to one or more temperature controllers 118. The one or more temperature controllers 118 can receive one or more electrical signals from the one or more temperature sensors 116 regarding the temperature within the one or more processing chambers 106 and/or can receive one or more inputs from a user of the oven 100. For example, the one or more inputs can regard a desired temperature change to the one or more processing chambers 106.

At 708, the method 700 can also comprise modulating the temperature within the one or more processing chambers 106 based on the monitoring by the one or more temperature sensors 116 by controlling the fan friction independent of the airflow within the oven 100. For example, the one or more temperature controllers 118 can be operably coupled to one or more motor speed controllers 120, which can further be operably coupled to one or more second motors 114 powering the one or more heating blowers 102. The one or more motor speed controllers 120 can control the operation of the one or more heating blowers 102 via the one or more second motors 114. For instance, wherein the temperature within the one or more processing chambers 106 (e.g., as monitored by the one or more temperature sensors 116) is lower than a desired temperature inputted into the one or more temperature controllers 118, the one or more motor speed controllers 120 can control operation of the one or more heating blowers 102 to increase the amount of heat generated by fan friction. Thereby, the air within the oven 100 can be heated to a greater degree and the airflow generated by the one or more circulation blowers 110 can propel the heated air throughout the oven 100 (e.g., into the one or more processing chambers 106) to increase the temperature within the one or more processing chambers 106 to the desired temperature.

The one or more motor speed controllers 120 can control operation of the one or more heating blowers 102 (e.g., via the one or more second motors 114) independent of operation of the one or more circulation blowers 110. For example, a temperature within the one or more processing chambers 106 can be varied (e.g., via modulating the one or more heating blowers 102) by the one or more motor speed controllers 120 while maintaining a constant airflow (e.g., generated by the one or more circulation blowers 110). Advantageously, the temperature within the one or more processing chambers 106 can be modulated independently of the airflow within the one or more processing chambers 106.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is, of course, not possible to describe every conceivable combination of components, products and/or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An oven, comprising:

a processing chamber in fluid communication with a heating blower, wherein the heating blower heats air by fan friction, and wherein a temperature of the air in the processing chamber is modulated by a varying speed of the heating blower, and wherein a portion of air exiting the processing chamber is recirculated to the processing chamber without being reheated by the heating blower; and a circulation blower that circulates the air heated by the heating blower into the processing chamber, wherein an axis of rotation of the heating blower is parallel to an axis of rotation of the circulation blower and wherein the axis of rotation of the heating blower and the axis of rotation of the circulation blower are vertical relative to an orientation of the oven.

2. The oven of claim 1, wherein the air heated by the heating blower is fresh air introduced to the oven from outside of the oven by one or more intake ports.

3. The oven of claim 2, wherein processed air that has been in the processing chamber is expelled from the oven by one or more exhaust ports.

4. The oven of claim 3, wherein the fresh air is isolated from the processed air.

5. The oven of claim 1, further comprising:

a temperature controller, operably coupled to the heating blower that modulates a temperature within the processing chamber by controlling operation of the heating blower.

6. The oven of claim 5, wherein the temperature controller is operably coupled to a temperature sensor located within the processing chamber, wherein the temperature controller generates a signal based on the temperature as monitored by the temperature sensor.

7. The oven of claim 6, further comprising:

a motor speed controller, operably coupled to the temperature controller and the heating blower, wherein the motor speed controller controls operation of the heating blower based on the signal.

8. The oven of claim 1, wherein the heating blower heats the air by a friction generated from moving the air, and wherein the heating blower heats the air independent of the circulation blower circulating the air.

* * * * *